Jan. 18, 1949.  E. R. KANHOFER  2,459,434
DISTILLATION OF HYDROCARBONS
TO REMOVE FLUORINE COMPOUNDS
Filed Aug. 31, 1944
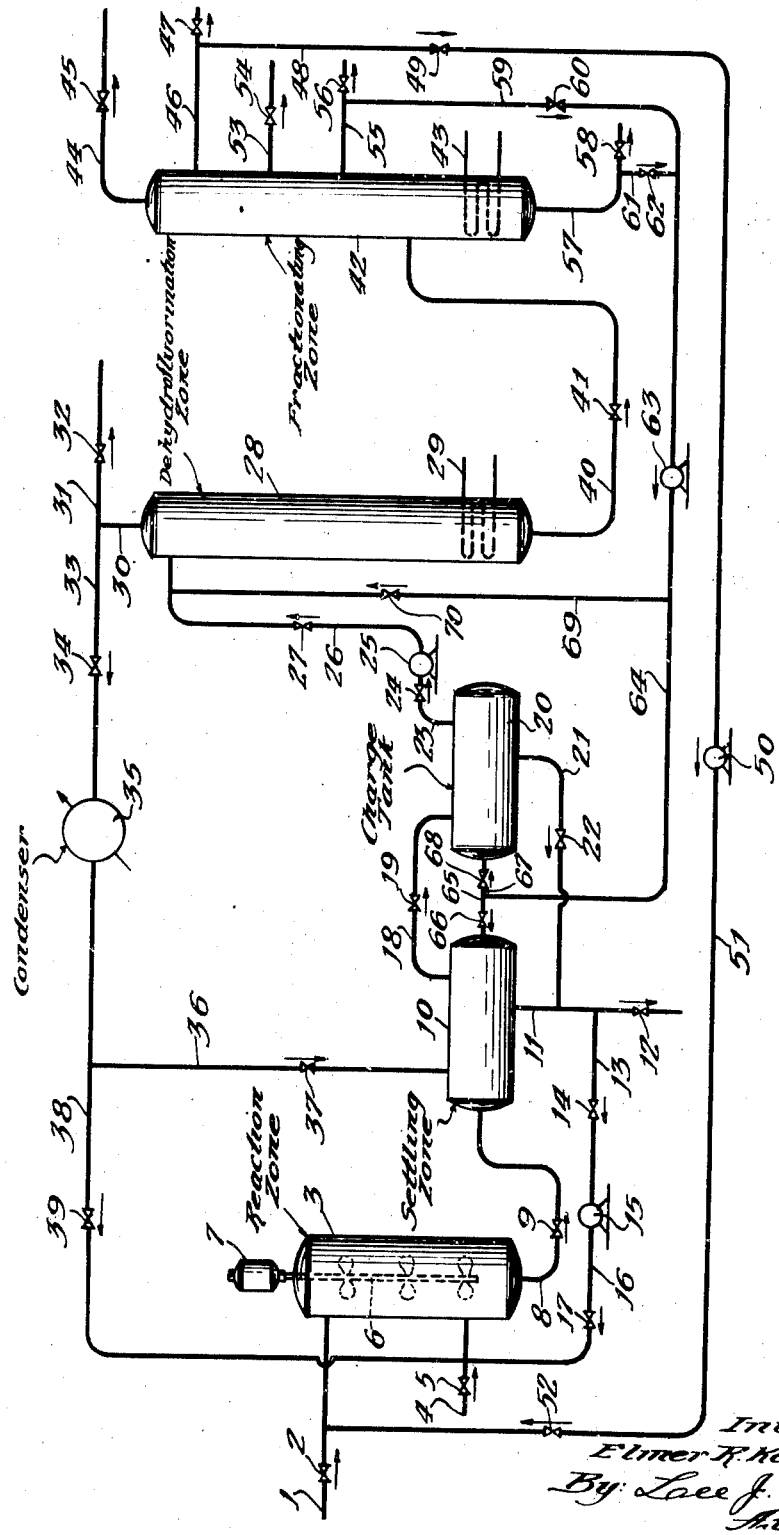
Inventor
Elmer R. Kanhofer
By: Lee J. Gary
Attorney.

Patented Jan. 18, 1949

2,459,434

UNITED STATES PATENT OFFICE 2,459,434

DISTILLATION OF HYDROCARBONS TO REMOVE FLUORINE COMPOUNDS

Elmer R. Kanhofer, Riverside, Ill., assignor to Universal Oil Products Company, Chicago, Ill., a corporation of Delaware Application August 31, 1944, Serial No. 552,127

14 Claims. (Cl. 202—39)

1

This invention relates to the treatment of hydrocarbons and more particularly to a novel method of removing fluorine compounds from the reaction product synthesized in the presence of an active fluoride catalyst.

The present invention is particularly adapted to the treatment of the alkylation product formed by the reaction of an isoparaffin with an olefin in the presence of an active fluoride catalyst including hydrogen fluoride or hydrofluoric acid, and mixtures comprising essentially hydrogen fluoride and boron fluoride. The effluent products from the alkylation zone contain dissolved hydrogen fluoride and minor quantities of fluorine in combination with the hydrocarbons, the combined fluorine compounds being formed possibly by the interaction of hydrogen fluoride with the olefinic constituents of the reaction mixture under the influence of the catalyst.

While the present invention is particularly applicable to the treatment of the alkylation product formed by the reaction of an isoparaffin with an olefin in the presence of an active fluoride catalyst, it is applicable to other condensation reactions effected in the presence of this type of catalyst, including alkylation of an aromatic hydrocarbon with an olefin, polymerization of olefinic hydrocarbons, condensation reactions in which one or more of the reactants comprise a fluorinated hydrocarbon, etc. The invention is also applicable to the treatment of the products formed by the reaction of organic compounds other than hydrocarbons in the presence of an active fluoride catalyst, in order to remove the fluorine compounds therefrom.

In a broad aspect, the present invention relates to a process for removing fluorine compounds as hydrogen fluoride from a reaction product synthesized in the presence of an active fluoride catalyst, which comprises fractionating said reaction product comprising unconverted reactant, higher boiling reaction product and fluorine compounds, to separate hydrogen fluoride from the remaining components, thereafter fractionating the remaining components to separate unconverted reactant from higher boiling reaction product, and recycling at least a portion of the last mentioned higher boiling reaction product to the first mentioned fractionating step.

In one specific embodiment, the present invention relates to a process for removing fluorine compounds as hydrogen fluoride from hydrocarbon reaction products resulting from the synthesis of at least one normally gaseous reactant in the presence of hydrogen fluoride, which com-

2 prises fractionating said reaction product comprising normally gaseous and normally liquid hydrocarbons and containing fluorine compounds, to separate hydrogen fluoride as an overhead vaporous stream from the hydrocarbons, thereafter separating normally gaseous hydrocarbons from normally liquid hydrocarbons, and recycling at least a portion of said normally liquid hydrocarbons to the first mentioned fractionating step to provide for maintaining a higher temperature therein without increasing the pressure.

In the alkylation, polymerization or other condensation reaction, after the reactants have been contacted with the catalyst and the reaction has proceeded to the desired extent, the products are commonly separated into a catalyst layer and a hydrocarbon layer. Usually an excess of one reactant is desirable, if not essential, in order to minimize undesired side reactions, and the hydrocarbon layer comprises unconverted reactant and the desired reaction product. For example, in the alkylation of an isoparaffin with an olefin, it is best to utilize an excess of isoparaffin over the olefin in order to minimize undesired polymerization of the olefins, and the effluent products from the alkylation zone will contain alkylated and unconverted isobutane.

Due to the solubility of hydrogen fluoride in hydrocarbons, the hydrocarbon layer will contain dissolved hydrogen fluoride and it will also contain organically combined fluorine compounds, such as alkyl fluorides. In the preferred embodiment of the present invention, the dissolved hydrogen fluoride and hydrogen fluoride formed by the decomposition of the organically combined fluorine compounds may be recovered in admixture from the same fractionating or dehydrofluorinating zone, and may be recycled to the reaction zone for further use therein.

As heretofore set forth, in the alkylation of an isoparaffin with an olefin, it is desired to use an excess of isoparaffin compared to olefin, and usually this excess should be greater than a mole ratio of 2:1 and in some cases may be as high as 20:1 or more. However, when increasing the ratio of isoparaffin to olefin, the quantity of unconverted isoparaffin present in the effluent products will accordingly be increased, and consequently the quantity of isoparaffin in the hydrocarbon layer subsequently supplied to the dehyfluorination zone will be increased. In order to maintain the desired temperature in the dehydrofluorination zone to effect satisfactory removal of fluorine compounds, the increase in quantity of isoparaffin will increase the pressure due to the fact that the isoparaffin is of greater volatility than the normally liquid alkylation product. Stated in other words, the increase in isoparaffin to olefin ratio in the alkylation zone means a greater quantity of isoparaffin which passes unconverted through the alkylation zone and thereby increases the ratio of isoparaffins to liquid alkylate in the effluent products. Since the isoparaffin is of greater volatility than the alkylation product, it will develop a greater pressure during subsequent heating and dehydrofluorination. Further, in the conventional methods of recovering isobutane, for example, varying percentages of propane are also included in the isobutane fraction. By increasing the ratio of isobutane supplied to the alkylation zone, the quantity of propane is accordingly increased. Propane is of greater volatility than even the isobutane and the increase in propane in the feed to the process will further increase the pressure generated during the heating and dehydrofluorination. This situation is further aggravated if per chance ethane or methane are included along with the isobutane or are formed during the reaction.

When designing commercial plants, it is desirable to use the lowest possible design pressure in order to avoid the use of special metals or alloys or increased metal thickness, which otherwise may be necessary when designing for a higher operating pressure and which adds considerably to the cost of the equipment. In addition, some of the plants already installed are limited to the maximum pressure which can be used in the dehydrofluorination zone and no other satisfactory means is available for obtaining higher temperatures except to replace the present equipment with more expensive equipment designed for use at higher pressures. The present invention proposes a novel method for obtaining increased temperatures in the dehydrofluorination zone without the disadvantages hereinbefore set forth.

Dehydrofluorination, as used in the present specification and claims, embraces fractionation to remove the dissolved hydrogen fluoride in one embodiment, and the removal of both dissolved hydrogen fluoride and hydrogen fluoride formed by decomposition of the organically combined fluorine compounds in the preferred embodiment of the invention. In the first stated embodiment, the dehydrofluorination zone usually comprises a fractionating zone containing conventional bubble decks, trays, side to side pans, etc. In the preferred embodiment of the invention, the dehydrofluorination zone preferably contains a suitable dehydrofluorinating agent, including metals such as aluminum, iron, lead, etc., which preferably are in porous condition; metal oxides, such as alumina, which may be substantially pure or which may comprise aluminous minerals, such as bauxite; metal salts, and particularly fluorides, such as aluminum fluoride, calcium fluoride, etc., which likewise are preferably in porous condition. When desired, these dehydrofluorinating agents may be dispersed on suitable carriers.

It is understood that the above dehydrofluorinating agents are not necessarily equivalent in their action. In fact, experiments have shown that some of the above agents will react with the liberated hydrogen fluoride at least during the initial portion of the treating cycle. It is, therefore, preferred to use agents, such as aluminum, which act more like a catalyst to decompose the organically combined fluorine compounds into hydrogen fluoride and hydrocarbon and thus release the hydrogen fluoride for recovery in commingled state with the dissolved hydrogen fluoride.

The invention will be further explained in connection with the following description and accompanying diagrammatic drawing. In the interest of simplicity, the following description will be limited to the alkylation of isobutane with butylene in the presence of hydrogen fluoride. However, it is understood that other suitable isoparaffins, such as isopentane, isohexane, etc., may be used, as well as other olefins, such as propene, pentene, hexene, heptenes, octenes, etc. When the higher boiling olefins, such as octenes, are used, the octenes for example may be considered as the polymer of two butylenes and, during the alkylation reaction, the polymer depolymerizes and reacts as two butylene radicals, the process being known as depolyalkylation.

Referring to the drawing, the charging stock which, in the case here illustrated, comprises isobutane and butylenes, is introduced to the process, at a suitable temperature and pressure, through line 1 containing valve 2 and is supplied to reaction zone 3. Usually the charging stock will contain varying percentages of propane since, in conventional fractionation practices, propane is normally recovered in a mixture with the isobutane-butylene fraction. This fraction also usually contains normal butane and is known in the art as a "B—B" fraction. Hydrogen fluoride, likewise at a suitable temperature and pressure, is introduced to zone 3 through line 4 containing valve 5.

Zone 3 may comprise any suitable alkylation zone and is illustrated as a mechanically agitated reaction zone containing stirring mechanism 6 driven by motor 7. Other suitable reaction zones may comprise the so-called "time tank" reaction zone wherein mixing is effected by pumping the reactants and catalyst through a series of baffles or orifices. Alkylation of isobutane with butylene is usually effected at a temperature of below about 200° F. and preferably from about 50 to about 125° F. and generally at a pressure sufficient to maintain the reactants in liquid phase, which pressure is usually less than 200 pounds and more particularly about 75 to 125 pounds.

The effluent products are withdrawn from zone 3 through line 8 and valve 9 to settling zone 10. In zone 10 a hydrocarbon layer separates from a catalyst or acid layer, the catalyst layer being withdrawn from zone 10 through line 11 and it may be removed from the process, all or in part, through valve 12. Preferably, however, at least a portion thereof is recycled by way of line 13, valve 14, pump 15, line 16, valve 17 and line 4 to reaction zone 3 for further use therein. Usually a regulated portion of the acid layer withdrawn from zone 10 is supplied to a regenerating system, not shown, wherein hydrogen fluoride is recovered and from which it is recycled to reaction zone 3.

The upper hydrocarbon layer is withdrawn from zone 10 through line 18 and in the case here illustrated, is supplied through valve 19 into charge tank 20. Additional small quantities of hydrogen fluoride may settle out in tank 20 and may be directed through 21 containing valve 22 into line 11, wherefrom it may be removed from the process, recycled to zone 3 or subjected to regeneration in the manner hereinbefore set forth.

The hydrocarbon reaction products in charge tank 20 will contain dissolved hydrogen fluoride as well as organically combined fluorine compounds. These reaction products may be directed through line 23 and valve 24 to pump 25, by means of which they are increased to the desired pressure and directed through line 26 and valve 27 into dehydrofluorinating zone 28.

Zone 28, in the preferred embodiment of the present invention, contains a suitable dehydrofluorinating agent, such as aluminum rings, and is provided with reboiler 29, positioned in the lower portion thereof through which any suitable heating medium, such as steam or the like, may be passed. In place of internal reboiler 29, an external reboiler or any other suitable heating means may be employed. As hereinbefore set forth, the maximum pressure to which the reaction products may be raised by means of pump 25 will depend upon the maximum design pressure of dehydrofluorination zone 28. In some installations, this maximum pressure is between 200 pounds and 250 pounds and, in the specific example of the invention described subsequently herein, the maximum pressure of the particular installation concerned is 235 pounds. The maximum temperature obtainable, in view of the considerations hereinbefore set forth, at 235 pounds is about 207° F. At this temperature and with sufficient reflux, substantially all of the dissolved hydrogen fluoride may be stripped from the hydrocarbons and the organically combined fluorine compounds may be reduced. However, the organically combined fluorine compounds usually cannot be reduced low enough, and some means of increasing the temperature is necessary. In accordance with the present invention, a portion of the normally liquid alkylation product is recycled to zone 28, in a manner to be hereinafter described in detail, and by means of this recycling the relative proportion of isobutane, which has a high volatility, is reduced as compared to the normally liquid products which have a lower volatility. Thus, a higher temperature in zone 28 is obtained by means of the features of the present invention without a concomitant increase in pressure.

To illustrate the beneficial effects obtained by the use of increased temperatures in zone 28, at a bottom temperature of about 200° F., the weight per cent of fluorine in the effluent products may be reduced from 0.027 to about 0.010, whereas at a temperature of about 214° F., the weight per cent of fluorine may be reduced to about 0.003. By increasing the temperature to about 220° F., the per cent of fluorine may be reduced to practically zero.

The hydrogen fluoride may be removed from zone 28 through line 30 and may be withdrawn from the process through line 31 containing valve 32, but preferably at least a portion thereof is directed through line 33, valve 34, condenser or cooler 35, and is recycled either through line 36 and valve 37 to settling zone 10, from which it is supplied in the manner hereinbefore set forth to reaction zone 3, or the hydrogen fluoride may be recycled through line 38, valve 39 and line 4 direct to zone 3.

In the case here illustrated, the charge to zone 28 is introduced to the upper portion thereof and, in one embodiment of the invention, the charge so introduced serves as a cooling and refluxing medium in zone 28. While it is also within the scope of the invention to introduce the charge to zone 28 at either the mid-portion or lower portion thereof, the preferred method of operation is to supply the feed from charge tank 20 in commingled state with the recycled alkylation products to the upper portion of zone 28, the recycled alkylation products preferably being hot. Recycling of the hot alkylate will increase the temperature of the charge to zone 28 and thereby will serve to effect more efficient stripping of the hydrogen fluoride. Further, if any liquid hydrogen fluoride is carried over in the charge to zone 28, it will be immediately flashed off and will not be permitted to contact the bed of dehydrofluorinating agent in zone 28. It has been found that liquid hydrogen fluoride causes severe corrosion of the dehydrofluorinating agent. Since the alkylation product to be recycled is recovered in a heated condition, as will hereinafter be set forth, this method of operation advantageously utilizes the heat contained therein and thus effects a high thermal efficiency, thereby avoiding the necessity of utilizing extraneous reboiler or heaters for this purpose.

The hydrocarbon reaction products, which are now substantially free of dissolved hydrogen fluoride and, in accordance with the present invention, substantially free or at least considerably reduced in organically combined fluorine are removed from the bottom of zone 28 through line 40 and are directed through line 41 into fractionating zone 42. Although illustrated as comprising one column, provided with reboiler 43 which may be similar to heretofore described reboiler 29, zone 42 will usually comprise two or more fractionating zones whereby these products may be separated into a propane and lighter fraction, an isobutane fraction, a normal butane fraction, an aviation alkylate fraction and a higher boiling alkylate fraction. Thus, zone 42 may comprise a depropanizer, a deisobutanizer, a debutanizer and a rerun column. In this manner, propane and lower boiling material may be removed from the upper portion of zone 42 through line 44 and valve 45 to storage or elsewhere, as desired. Isobutane may be withdrawn from zone 42 through line 46 and may be withdrawn from the process through valve 47, but preferably at least a portion thereof is recycled by way of line 48, valve 49, pump 50, line 51, valve 52 and line 1 to reaction zone 3 for further use therein. This is particularly desirable when an excess of isobutane is utilized in the alkylation reaction as hereinbefore set forth and the isobutane recycled is regulated to maintain the desired isobutane to olefin ratio in the alkylation zone. Normal butane may be removed from zone 42 through line 53 and valve 54 to storage or elsewhere, as desired.

An aviation alkylate fraction, which usually will have an end boiling point within the range from about 250° F. to about 375° F., may be withdrawn from zone 42 through line 55 and may be removed from the process, all or in part, through valve 56, while higher boiling alkylation products may be removed from zone 42 through line 57 and withdrawn from the process, all or in part, through valve 58. In accordance with the present invention at least a portion of the aviation alkylate withdrawn through line 55 and/or the higher boiling alkylate products withdrawn through line 57 is supplied by way of line 59 and valve 60 and/or line 61 and valve 62, respectively to pump 63 by means of which it may be returned to zone 28. This return may be accomplished by supplying the recycled stream through line 64 and line 65 containing valve 66 into settling zone 10 and/or through line 67 containing valve 68 into charge tank 20. In either case, the recycled hydrocarbons will subsequently be supplied to dehydrofluorination zone 28. Part or all of this recycled stream may be supplied directly to zone 28 by being directed through line 69, valve 70 and line 26.

The exact quantity of alkylate to be recycled in any particular operation will depend upon the ratio of isoparaffin to olefin utilized in the alkylation zone, the quantity of lower boiling hydrocarbons, such as propane present in the charging mixture to the alkylation zone, and upon the activity of the particular dehydrofluorinating agent employed. In general, the quantity of alkylation products to be recycled will comprise between about 5% to about 25% of the charge to zone 28. In general, it may be stated that the greater the quantity of alkylate so recycled, the larger will be the increase in temperature obtainable in the dehydrofluorination zone. However, it usually will be undesirable to recycle greater than 25% of the charge to zone 28 due to the increased costs of pumping and the greater throughput through this portion of the system.

In the operation heretofore described, the liquid alkylation products are illustrated as being separated in zone 42 into aviation alkylate and higher boiling alkylation products prior to recycling thereof, but it is also within the scope of the invention to recycle the admixed aviation and higher boiling alkylation products, after removal of normally gaseous hydrocarbons therefrom, and before the aviation alkylate is separated from the higher boiling alkylation products.

In addition to the advantages hereinbefore set forth, the present invention offers a number of further advantages. Although the organically combined fluorine compounds are reduced to a low figure, the feature of recycling a portion of the alkylation product will serve to further reduce whatever small amount of organically combined fluorine compounds may be contained therein and, after being again blended with the final alkylation product, the average fluorine content of the final product will be reduced accordingly. Another advantage is that the liquid hydrocarbons recycled to the dehydrofluorination step will serve as a washing medium therein and thus may act to remove any undesirable foreign matter which may accumulate on the packing in this zone.

Although usually not preferred, it is also within the scope of the invention to subject the alkylation product to extraneous cooling, by means not illustrated, prior to recycling thereof to zone 28.

The following example is introduced to further illustrate the novelty and utility of the present invention, but not with the intention of unduly limiting the same.

The feed to the alkylation zone may comprise a mixture of propane, isobutane, normal butane and butylenes, the mole ratio of isobutane to butylenes being 4:1, and the propane comprising 10% by volume of the feed. The isobutane may be alkylated with the butylenes in the presence of a hydrogen fluoride catalyst at a temperature of 100° F., and a pressure of 75 pounds. The effluent products from the alkylation zone may be supplied to a settling zone, wherein a hydrocarbon layer is separated from an acid layer. The hydrocarbon layer contains dissolved hydrogen fluoride and about 0.027% of organically combined fluorine compounds.

In accordance with the invention, the hydrocarbon layer is commingled with 20 per cent by volume of higher boiling alkylate, separated in a manner to be hereinafter set forth, and then is subjected to dehydrofluorination in the presence of aluminum rings at a temperature of 222° F. and a pressure of 235 pounds. The product from the dehydrofluorination zone will be substantially free of fluorine compounds and is then directed into a deisobutanizer column operating with a bottom temperature of 220° F. and a pressure of 116 pounds. In this zone isobutane and lower boiling material are removed as an overhead stream, and this overhead stream is supplied to a depropanizer column operated with a bottom temperature of 195° F. and a pressure of 225 pounds to separate propane and lower components from isobutane. The isobutane may be recycled to the alkylation zone in a regulated amount to form a feed comprising a mole ratio of isobutane to butylenes of 4:1. The liquid hydrocarbons remaining unvaporized in the deisobutanizer may be supplied to a debutanizer operating with a bottom temperature of 390° F. and a pressure of 110 pounds to separate normal butane from normally liquid alkylation products. The normally liquid alkylation products may be supplied to a rerun column operated with a top temperature of 227° F., a bottom temperature of 430° F. and a pressure of 8 pounds, to separate an overhead aviation alkylate having an end boiling point of about 350° F. from a bottom product comprising the highere boiling alkylate. 20 per cent by volume of the higher boiling alkylate is commingled with the hydrocarbon layer as heretofore set forth.

As contrasted to the substantially complete removal of fluorine compounds obtainable by the features of the present invention, in another operation similar to that hereinbefore described but not employing the features of the present invention, the highest bottom temperature obtainable at a pressure of 235 pounds in the dehydrofluorination zone is about 207° F. and this will produce a final alkylate having a fluorine content of about 0.010. Although a fluorine content of 0.010 may appear to be satisfactory, it will form silicon tetrafluoride when passing through subsequent portions of the system containing silica. For example, in some of the commercial installations, the effluent products from the lower portion of the conventional dehydrofluorinating zones are passed through a zone containing bauxite in order to remove the last traces of fluorine compounds. When silicon tetrafluoride is formed, it results in plugging of the condensers and also results in severe corrosion. As another advantage to the present process, complete removal of fluorine compounds is effected in the dehydrofluorinating zone and this will eliminate the necessity of also utilizing bauxite-containing zones.

I claim as my invention:

1. A process for removing fluorine compound as hydrogen fluoride from a mixture of reaction products comprising unconverted reactant, higher boiling reaction product and fluorine compound, which comprises fractionally distilling said mixture to separate hydrogen fluoride from the unconverted reactant and higher boiling reaction product, thereafter separating by fractionation the unconverted reactant from the higher boiling reaction product, and recycling at least a portion of the said higher boiling reaction product to the first mentioned fractional distillation step.

2. A process for removing fluorine compound as hydrogen fluoride from an effluent alkylation product, comprising unconverted reactant, alkylate and fluorine compound, formed in the presence of hydrogen fluoride, which comprises fractionating said alkylate to separate hydrogen fluoride from the unconverted reactant and alkylate, thereafter fractionating to separate unconverted reactant from the alkylate, and recycling at least a portion of the alkylate to the first mentioned fractionating step.

3. A process for removing fluorine compound as hydrogen fluoride from an effluent hydrocarbon reaction product, comprising normally gaseous and normally liquid hydrocarbons and containing fluorine compound, resulting from the synthesis of at least one normally gaseous reactant in the presence of an active fluoride catalyst, which comprises fractionating said reaction product to separate hydrogen fluoride, thereafter separating normally gaseous hydrocarbon from normally liquid hydrocarbon, and recycling from about 5% to about 25% by volume of said normally liquid hydrocarbon to the first mentioned fractionating step.

4. A process for removing fluorine compound as hydrogen fluoride from an effluent hydrocarbon reaction product, comprising normally gaseous and normally liquid hydrocarbons and containing fluorine compound, resulting from the synthesis of at least one normally gaseous reactant in the presence of hydrogen fluoride, which comprises fractionating said reaction product to separate hydrogen fluoride as an overhead vaporous stream from the hydrocarbon, thereafter separating normally gaseous hydrocarbon from normally liquid hydrocarbons, and recycling at least a portion of said normally liquid hydrocarbons to the first mentioned fractionating step to provide for maintaining a high temperature therein without increasing the pressure.

5. A process for removing hydrogen fluoride from an effluent reaction product comprising unconverted reactant, higher boiling reaction product and dissolved hydrogen fluoride, synthesized in the presence of an active fluoride catalyst, which comprises fractionating said reaction product to separate the hydrogen fluoride from the unconverted reactant and higher boiling reaction product, thereafter separating the unconverted reactant from the higher boiling reaction product, and recycling at least a portion of the last mentioned higher boiling reaction product to the first mentioned fractionating step.

6. A process for removing hydrogen fluoride from an effluent alkylation reaction product comprising unconverted isoparaffin, normally liquid alkylate and dissolved hydrogen fluoride, resulting from the alkylation of an isoparaffin with an olefin in the presence of hydrogen fluoride, which comprises fractionating said reaction product to separate dissolved hydrogen fluoride, thereafter separating unconverted isoparaffin from the alkylate, and recycling the last mentioned alkylate to the first mentioned fractionating step in an amount of from about 5% to about 25% of said reaction product.

7. A process for treating an effluent hydrocarbon reaction product comprising unconverted reactant, higher boiling reaction product, and organically combined fluorine compound, formed in the presence of an active fluoride catalyst, which comprises fractionating said hydrocarbon reaction product in the presence of a dehydrofluorinating agent under conditions to decompose said organically combined fluorine compound into hydrogen fluoride and hydrocarbon and to separate the hydrogen fluoride formed by said decomposition from the hydrocarbons, thereafter separating the unconverted reactant from higher boiling reaction product, and recycling at least a portion of the last mentioned higher boiling reaction product to the first mentioned fractionating step.

8. A process for treating an alkylation product comprising unconverted isoparaffin, higher boiling alkylate and organically combined fluorine compound, synthesized in the presence of hydrogen fluoride, which comprises fractionating said alkylation product in the presence of metal dehydrofluorinating agent under conditions to decompose said organically combined fluorine compound into hydrogen fluoride and hydrocarbon and to separate said hydrogen fluoride from the hydrocarbon, thereafter separating unconverted isoparaffin from the higher boiling alkylate, and recycling said alkylate to the first mentioned fractionating step in an amount of from about 5% to about 25% of the first mentioned alkylation product, to provide for maintaining a higher temperature in the first mentioned fractionating step without increasing the pressure therein.

9. A process for treating an alkylation product comprising unconverted isobutane, higher boiling alkylate, dissolved hydrogen fluoride and organically combined fluorine compound, which comprises fractionating said alkylation product in the presence of aluminum under conditions to decompose said organically combined fluorine compound into hydrogen fluoride and hydrocarbon and to separate said hydrogen fluoride and the dissolved hydrogen fluoride from the hydrocarbons, separating unconverted isobutane from the higher boiling alkylate, thereafter separating said alkylation product into a lower boiling fraction and a higher boiling fraction, and recycling, without intentional prior cooling thereof, at least a portion of said higher boiling fraction to the first mentioned fractionating step.

10. A process for treating an alkylation product comprising unconverted isobutane, higher boiling alkylate and organically combined fluorine compound, synthesized in the presence of hydrogen fluoride, which comprises fractionating said alkylation product in the presence of aluminum under conditions to decompose said organically combined fluorine compound into hydrogen fluoride and hydrocarbon and to separate said hydrogen fluoride from hydrocarbon, separating unconverted isobutane from the higher boiling alkylate, thereafter separating said alkylation product into a lower boiling fraction having an end boiling point within the range of from about 250° F. to about 375° F., and a higher boiling alkylation product, and recycling the last mentioned higher boiling alkylation product, without intentional prior cooling thereof, to the first mentioned fractionating step in an amount of from about 5% to about 25% of the first mentioned alkylation product being supplied to said fractionating step in order to maintain a higher temperature therein without increasing the pressure.

11. In the conversion of hydrocarbon reactants to relatively higher boiling conversion products in the presence of a fluorine-containing conversion catalyst, the improved method of removing fluorine compounds from the resultant products which comprises introducing said products comprising unconverted reactants, higher boiling conversion products and fluorine compounds into a fractionating zone, separating hydrogen fluoride overhead from said zone, withdrawing the remaining products from the bottom of said zone, and separating from said remaining products and recycling to said fractionation zone a portion of said higher boiling conversion products whereby to increase the relative proportion of higher boiling components in the material being fractionated in said zone.

12. The process of claim 11 further characterized in that said fractionating zone contains a dehydrofluorinating agent to effect decomposition of organic fluorine compounds during said fractionation.

13. The process of claim 11 further characterized in that said catalyst comprises hydrogen fluoride.

14. The process of claim 11 further characterized in that said unconverted reactants comprise an isoparaffin hydrocarbon, said higher boiling conversion products comprise isoparaffin alkylation products, and said fluorine compounds comprise hydrogen fluoride and organic fluorine compounds.

ELMER R. KANHOFER.

REFERENCES CITED

The following references are of record in the file of this patent:

UNITED STATES PATENTS

| Number | Name | Date |
| --- | --- | --- |
| 1,869,781 | Shiffler | Aug. 2, 1932 |
| 2,371,341 | Matuszak | Mar. 13, 1945 |
| 2,357,028 | Shiras | Aug. 29, 1944 |
| 2,388,919 | Iverson | Nov. 13, 1945 |